Figure 1:
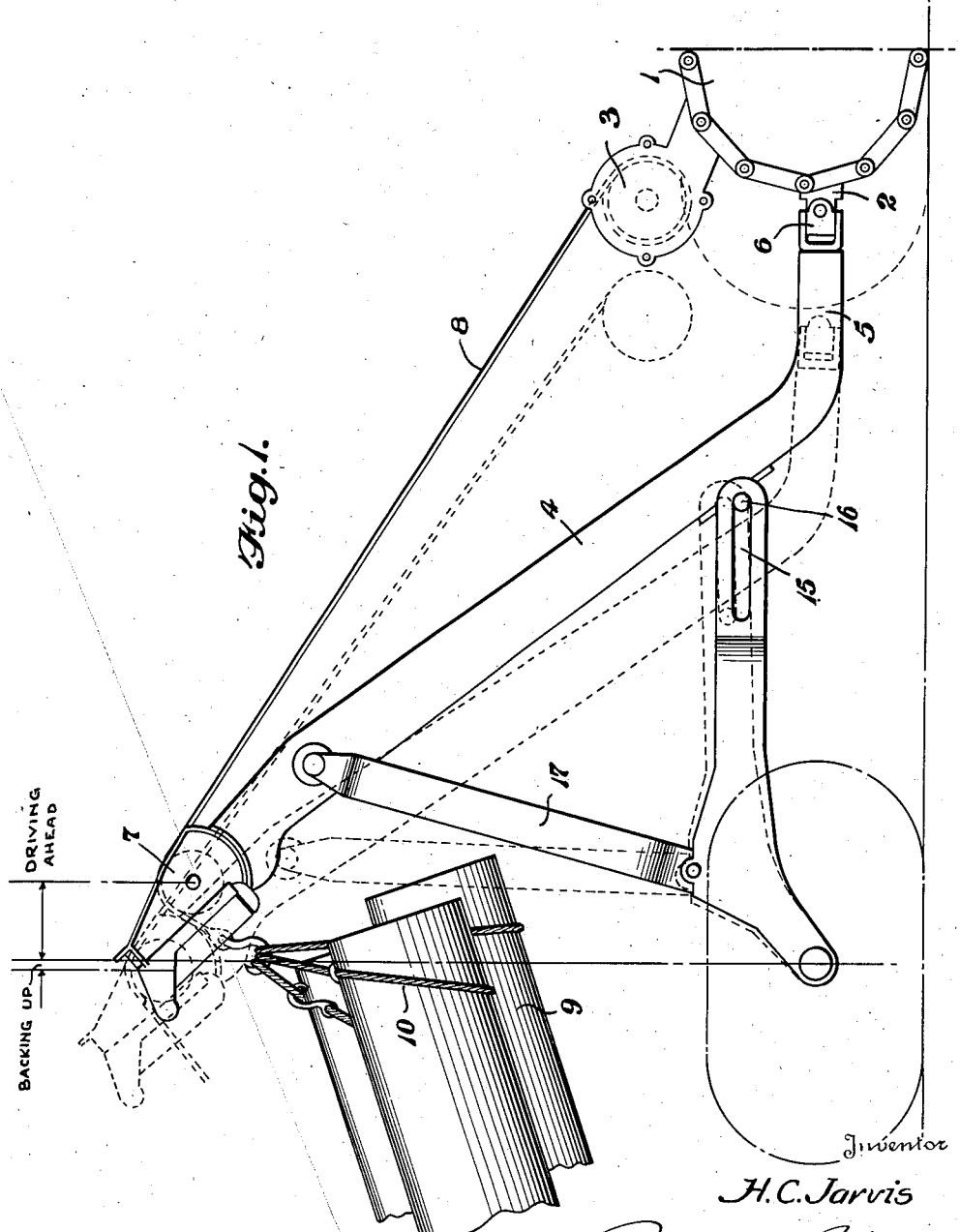

Aug. 11, 1942.　　　H. C. JARVIS　　　2,292,878
SLIDING REACH YARDER
Filed June 3, 1941　　　2 Sheets-Sheet 1

Inventor
H. C. Jarvis
By Ralph D. Barrett
Attorney

Aug. 11, 1942.  H. C. JARVIS  2,292,878
SLIDING REACH YARDER
Filed June 3, 1941  2 Sheets-Sheet 2
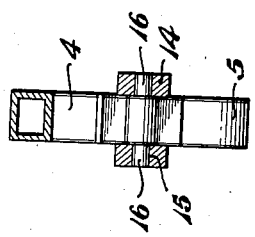
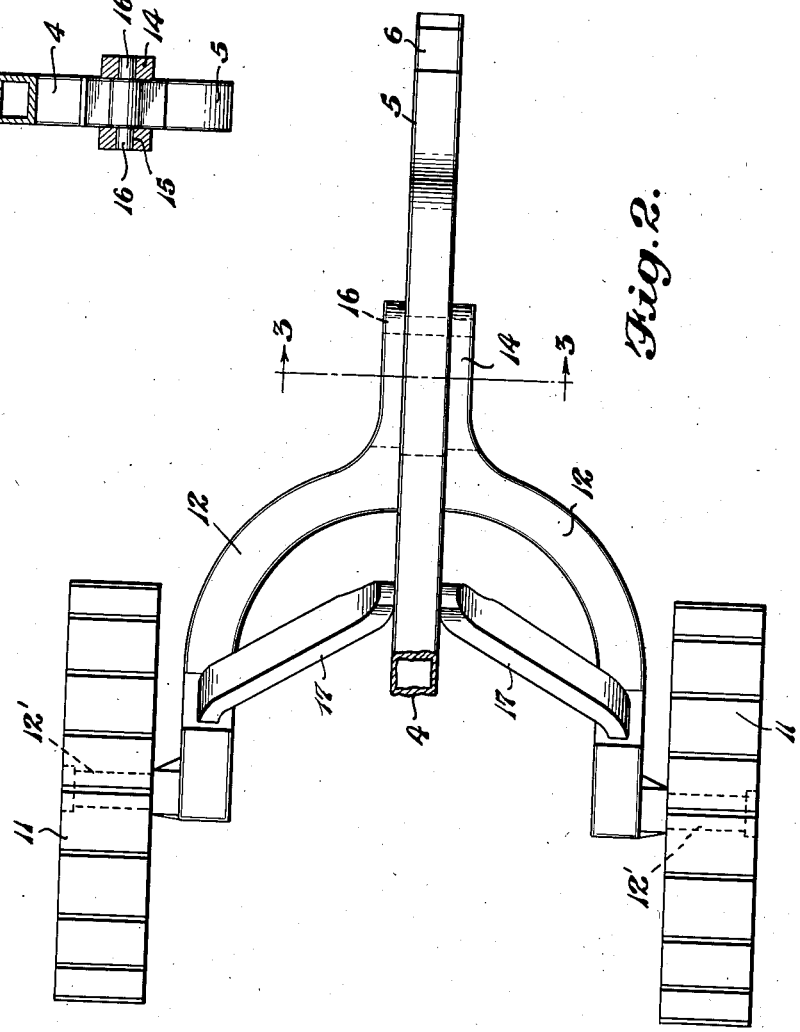
Inventor
H. C. Jarvis
By Ralph Barrett
Attorney Patented Aug. 11, 1942

2,292,878

UNITED STATES PATENT OFFICE 2,292,878

SLIDING REACH YARDER

Herbert C. Jarvis, Seattle, Wash., assignor to Pacific Car and Foundry Company, Renton, Wash.

Application June 3, 1941, Serial No. 396,471

9 Claims. (Cl. 214—65.3)

This invention relates to improvements in yarders utilized in the handling of logs and analogous material.

One of the main objects of the present invention is to provide a construction wherein more weight is provided on the tractor tracks to pull a decreased yarder load.

A further object of the invention is to provide more perfect balance of the tractor in an assembly using only one connection between the yarder and the tractor.

A further object of the invention is to provide means whereby logs may be elevated to their position with respect to the fairlead by materially less force than is necessary in conventional structures.

Another object is to so construct a reach member of a yarder assembly that the supporting wheels will be capable of movement upon engagement with the load during its elevation to the fairlead, thus materially decreasing the power normally essential to the operation and saving the log extremities against injury.

A further object of the invention is to provide a yarder structure in which the boom is connected to the power tractor and is capable of relative movement therewith to permit forward shifting of the supporting wheels during loading.

A further object is to provide a yarder of strong and durable construction yet capable of extreme flexible movements to permit and facilitate manipulation in confined areas and under adverse conditions.

Other features will more clearly hereinafter appear by reference to the accompanying drawings, and claims forming a part of this specification, in which similar reference characters indicate corresponding parts throughout the several views, in which Fig. 1 is a side elevation.
Fig. 2 is a top plan view.
Fig. 3 is a section on line 3—3 of Fig. 2.

Referring to Figure 1 a power tractor is indicated by reference character 1, this tractor including the coupler section 2 and the hoist 3. Such tractors being conventional in the art a complete disclosure and detailed description is omitted from the description.

The yarder embodies a boom 4, the lower portion 5 being bent to extend substantially horizontally and terminating in coupler 6 for cooperation with coupler element 2 of the tractor 1. The upper and rearward extremity of the boom 4 embodies the fairlead 7 for guiding the cable 8 which extends to the hoist 3 of the tractor as is conventional. The outer end of the cable 8 is connected to the load such as the logs 9 by suitable connections 10. The connections may be of any desired type, the present form being shown merely for the purpose of illustration. The spaced wheels or tracks 11 provide the track means for the yarder and support such portions of the load as may be distributed thereto by virtue of the embodied structure. The wheels or tracks 11 are connected to the extremities of the U arms 12 of the reach by means of stub axles 12', the U arms 12 converging at the forward beam 14, the latter being provided with elongated slots 15 which form trackways for the pin 16 fixed to the bottom face of the boom 4. The connection between the slots 15 and the pin 16 form a sliding hinge which will permit forward movement of the wheels 11 under conditions to be hereinafter explained. Struts 17 are interposed between end portions of the U arms 12 of the reach and the upper rear end of the boom 4. The connections between the struts 17 and the reach and the boom may be of any type and these connections may be adjustable to permit the accommodation of varying load conditions, strains and stresses. In use it is found that the action of the load 9 on the tracks 11 is an extremely vital factor both with respect to the power required in the lifting of the load and in the preservation of the load itself against injury. During loading operation the logs are skidded into contact with the wheels or tracks 11. The continued application of force to the cable 8 moves the logs 9 upwardly over the wheels or tracks 11, and the latter, due to the sliding connection between the reach and boom, move forwardly. The forward movement of the wheels or tracks results in a partial rotation and a consequent lifting effect upon the logs. In other words the rotating wheels or tracks carry the log extremities upward thus reducing the force essential to the operation and eliminating friction which has a tendency to split the log ends. It has been found that the rolling contact between the wheels and logs, due to the sliding connection 15—16 between the reach and the boom, is so frictionless that it is practical to substitute for the conventional metal wheels or tracks resilient or cushion parts. In assembling the relative parts of the yarder it is essential that the strut be positioned in a definite position with respect to the reach and boom. An adjustment forward of the upper end of the strut from normal, produces an increased tendency of the track to run forward under load while a rearward adjustment of the upper strut connection produces an increasing tendency for the tracks to run rearward. This tendency is particularly noticeable by observing the action of the fairlead as it rises and falls as the tracks are run back and forth. At the extreme back position there is a sharp rise in the fairlead. The ideal setting of the lower strut connection should be such that the tracks are always forced backward under load to the point where the fairlead rises sharply. This will keep the tracks back in place even in steep down hill logging and the sharp rise at the extreme back will act as a cushion to stop the tracks in their rearward motion, thus removing shock. If the lower end of the strut were placed directly on or above the yarder axle, the result would be too hard a load action backward on the tracks, too great a drop in altitude of the load and the cushion effect just described would be diminished.

Where necessary spring or stop members may be properly located between the moving parts and particularly at the reach and boom connection. Also fenders and other accessories may be included if and when essential to the successful operation of the apparatus.

What I claim is:

1. In combination with a tractor provided with a coupling section and cable hoist mechanism, a boom including an angularly positioned body having its forward lower extremity extending horizontally and terminating in a coupling element for connection with the coupling element of the tractor and its upper extremity provided with a fairlead for guiding said cable, spaced wheel elements, a reach having spaced rear end portions for connection with the wheels and a slotted forward portion, and pin members carried by the angularly extending body portion of the boom seated in said slots.

2. A logging apparatus comprising in combination, a power actuated tractor carrying cable actuated mechanism, a boom pivotally connected at its front end to said tractor and having a fairlead in its rear end for guiding said cable, wheels having axles, a reach member interposed between the axles and the boom, said reach member and said boom being connected for limited relative sliding movement under loading conditions to cause said wheels to move forwardly to assist elevation of the load, and a strut between the reach and the boom.

3. A yarder including spaced wheels and axles, a reach connected at its rear extremity to said axles, said reach being provided with elongated guideways, a boom, projections extending from said boom for engagement within said guideways to limit the relative movement between the reach and the boom, and a strut member interposed between the rear end portion of the reach and the rear end portion of the boom.

4. A yarder including spaced wheels and axles, a reach connected at its rear portion to said axles, a boom having a forward horizontally extending portion for connection to a source of power and a rear portion provided with cable guideways, and means connecting the forward end of the reach to an intermediate portion of said boom in such a manner that said reach will be capable of horizontal movement with respect to the boom upon movement of the wheels under loading conditions whereby said wheels will function to assist the elevation of the load.

5. In combination with a tractor provided with a coupling section and cable hoist mechanism, a boom including an angularly positioned body portion and a substantially horizontal lower end portion for connection with the coupling section of the tractor, spaced wheel elements, a reach having spaced rear end portions for connection with the wheel elements, the front end portion of said reach being connected to the angularly positioned body of the boom in a manner to permit relative sliding movement between these parts, and a strut between the rear end portion of the reach and the rear end portion of the boom.

6. In a yarder assembly, a boom having a front end portion for connection to a source of power and a fairlead, spaced wheels, a reach member having axles for mounting said wheels and a sliding connection with said boom to permit relative movement between the source of power and said wheels, and strut members interposed between the rear of said reach and said boom.

7. The substance of claim 6 characterized in that the lower end of the struts are connected to the reach above the wheels and their upper ends are connected to the boom adjacent its rear end.

8. In a yarder including a boom for pivotal connection with a tractor, said boom carrying a fairlead at its rear end, wheel members, and a reach connected to the boom and wheel members and slidingly engaging the boom to permit said fairlead to be shifted by movement of said wheels under loading conditions.

9. In combination with a tractor provided with a coupling section and a cable hoist mechanism, a boom member including an angularly positioned body portion and a substantially horizontally extending forward portion provided with a coupling section for connection with the coupling section of the tractor, a fairlead at the upper rear end portion of said boom, spaced wheel elements, a reach having spaced rear end portions for connection with the wheel elements, the front end portion of the reach being connected to the boom member in a manner to permit the wheels to move forwardly in the direction of the reach during loading operation, and a strut member interposed between the reach and the boom member and being so constructed and arranged that it will cause a sharp rise to the fairlead and load in the extreme rearward movement of the tractor whereby a cushioning of the parts is accomplished.

HERBERT C. JARVIS.